United States Patent
Best et al.

(10) Patent No.: US 7,318,489 B2
(45) Date of Patent: Jan. 15, 2008

(54) HYDRAULIC MOTOR ARRANGEMENT AND METHOD OF OPERATING A HYDRAULIC MOTOR

(75) Inventors: Bruno Best, Rijswijk (NL); Egbert Jan Van Riet, Rijswijk (NL)

(73) Assignee: Shell Oil Company, Houston, TX (US)

( * ) Notice: Subject to any disclaimer, the term of this patent is extended or adjusted under 35 U.S.C. 154(b) by 309 days.

(21) Appl. No.: 11/039,683

(22) Filed: Jan. 19, 2005

(65) Prior Publication Data

US 2005/0188688 A1 Sep. 1, 2005

(30) Foreign Application Priority Data

Jan. 23, 2004 (EP) .................................. 04100238
Jan. 23, 2004 (EP) .................................. 04100240

(51) Int. Cl.
*E21B 4/02* (2006.01)
(52) U.S. Cl. .................. 175/57; 175/107; 175/106
(58) Field of Classification Search ................. 175/57, 175/106, 107; 91/4 R, 4 A
See application file for complete search history.

(56) References Cited

U.S. PATENT DOCUMENTS

| | | | | |
|---|---|---|---|---|
| 3,743,013 A | | 7/1973 | Harbonn ...................... | 166/0.5 |
| 3,901,033 A | * | 8/1975 | McAlister ..................... | 60/516 |
| 3,921,500 A | * | 11/1975 | Silcox .......................... | 91/4 R |
| 3,937,599 A | | 2/1976 | Thureau et al. ............. | 417/389 |
| 4,016,719 A | * | 4/1977 | Yavnai ......................... | 60/416 |
| RE29,526 E | * | 1/1978 | Jeter ............................ | 175/73 |
| 4,098,359 A | * | 7/1978 | Birdwell ...................... | 175/93 |
| 4,211,291 A | * | 7/1980 | Kellner ......................... | 175/17 |
| 4,462,469 A | * | 7/1984 | Brown ......................... | 175/40 |
| 4,483,411 A | | 11/1984 | Mifsud ........................ | 181/120 |
| 4,514,834 A | | 4/1985 | Hanson et al. .............. | 367/141 |
| 4,541,241 A | * | 9/1985 | Schulze ........................ | 60/414 |
| 4,702,343 A | | 10/1987 | Paulsson ...................... | 181/106 |
| 4,745,846 A | * | 5/1988 | Eickmann .................... | 91/488 |
| 4,805,727 A | | 2/1989 | Hardee ........................ | 181/106 |
| 4,845,982 A | | 7/1989 | Gilbert ........................ | 73/151 |
| 5,382,760 A | | 1/1995 | Staron ......................... | 181/121 |
| 6,085,862 A | | 7/2000 | Tenghamn ................... | 181/110 |
| 6,230,823 B1 | * | 5/2001 | Sieniawski .................. | 175/107 |
| 2001/0020218 A1 | | 9/2001 | Cosma | |
| 2002/0070368 A1 | | 6/2002 | Rountree .................. | 251/30.01 |
| 2003/0056990 A1 | * | 3/2003 | Oglesby ...................... | 175/57 |
| 2003/0116969 A1 | | 6/2003 | Skinner ........................ | 290/1 |
| 2004/0245019 A1 | * | 12/2004 | Hartwick ...................... | 175/57 |
| 2005/0194130 A1 | * | 9/2005 | Best et al. .................. | 166/249 |
| 2006/0266526 A1 | * | 11/2006 | Ocalan et al. .............. | 166/370 |

FOREIGN PATENT DOCUMENTS

| | | |
|---|---|---|
| EP | 1109034 | 6/2001 |
| WO | 82/01738 | 5/1982 |

* cited by examiner

*Primary Examiner*—David Bagnell
*Assistant Examiner*—David Andrews

(57) ABSTRACT

A hydraulic motor for use in subterranean drilling operations in which a drive fluid within a first reservoir is forced through the motor by a high pressure working fluid, such as drilling mud, the drive fluid entering a second reservoir upon exiting the motor. Upon a change in valving, the drive fluid in the second reservoir is forced through the motor by the high pressure working and back into the first reservoir.

20 Claims, 5 Drawing Sheets

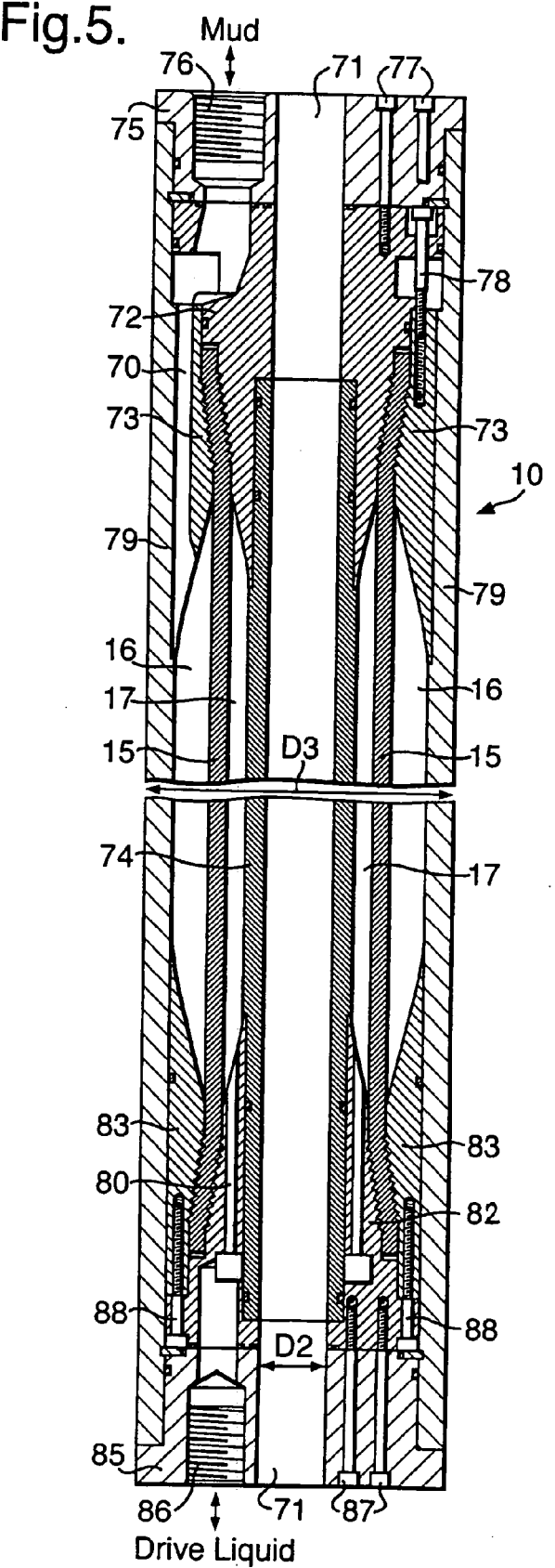

HYDRAULIC MOTOR ARRANGEMENT AND METHOD OF OPERATING A HYDRAULIC MOTOR

BACKGROUND OF THE INVENTION

The present invention relates to a hydraulic motor arrangement comprising a hydraulic motor, in particular a down-hole hydraulic motor, and supply means for supplying a drive liquid under pressure to the hydraulic motor for driving the hydraulic motor.

The present invention also relates to a method of operating a hydraulic motor.

DESCRIPTION OF THE RELATED ART

For the purpose of this specification, a hydraulic motor is a motor driven by a pressurized drive liquid and converts a part of this pressure into mechanical motion.

In subsurface drilling operations, so-called mud motors are generally applied, whereby the drive liquid is formed by a drilling mud that is circulated through a drill string and an annulus formed between the bore hole wall and the drill string reaching inside the bore hole. Examples of such mud motors are Moineau motors or positive displacement motors (PDM), or mud turbines.

Not all types of hydraulic motors are suitable for being driven by mud. Drilling mud, when passed through the hydraulic motor, can be a cause of wear, damage, and clogging up of the hydraulic motor mechanism.

U.S. Pat. No. 3,743,013 describes a device for the storage and use of hydraulic power to operate one or more hydraulic devices. This device has an oil- and air accumulator and a spring loadable expel chamber. A working cycle is as follows. A pressurised working fluid is received in the expel chamber, thereby displacing a piston which expels a drive fluid into the accumulator. Energy is thereby stored in the accumulator. During this phase of the cycle, the drive fluid bypasses the hydraulic devices. The displacement of the piston also loads the spring to store energy in the spring. After the accumulator and the spring are loaded, the drive liquid is led to one or more of the hydraulic devices for actuation and subsequently back into the expel chamber thereby expelling the working fluid.

A drawback of this device is that power is lost during the loading and unloading of the spring and the accumulator. This is particularly a disadvantage for any down-hole application as power is scarce there.

Another drawback of the known device is that the hydraulic power available for actuating decreases during the release of the drive fluid from the accumulator, because the pressure difference decreases. This makes the known devices less suitable for driving a hydraulic motor, for which a more steady power is desirable.

SUMMARY OF THE PRESENT INVENTION

In accordance with the invention, there is provided a hydraulic motor arrangement comprising a hydraulic motor and supply means for supplying a drive liquid to the hydraulic motor for driving the hydraulic motor, which supply means comprises a first and a second expel reservoir, whereby the first expel reservoir is arranged to hold the drive liquid, and arranged to receive a pressurized working fluid different from the drive liquid from a high-pressure zone, and upon receipt thereof to displace and expel the drive liquid from the first expel reservoir into an expel system which includes the hydraulic motor, and whereby the second expel reservoir is arranged downstream the hydraulic motor to receive the expelled drive liquid and, upon receipt thereof, to displace and expel an exhaust fluid different from the drive liquid into a low-pressure zone.

In this arrangement, the pressure of the pressurized working fluid is transferred to the drive liquid in the expel reservoir, and then utilized for driving the hydraulic motor. Since the pressure difference between the high pressure zone and the low pressure zone does not necessarily change during the operation, the hydraulic motor arrangement of the invention is capable of delivering a constant power as long as there is drive liquid in the first expel chamber.

An advantage of the invention is that the drive liquid can be collected in the second expel reservoir, and recirculated through the hydraulic motor arrangement for use in a next cycle.

The exhaust fluid may be a fluid of the same type as the working fluid, such as for instance a drilling fluid.

In a practical embodiment, after the exhaust fluid has been expelled from the second expel reservoir into the low pressure zone, the second expel reservoir is exposed to the pressurised working fluid, thereby displacing and expelling the drive liquid from the second expel reservoir back to the first expel reservoir.

On its way back to the first expel reservoir, the drive fluid can be led through the hydraulic motor for driving the hydraulic motor.

To this end, a supply manifold may be provided having valve means arranged to supply the pressurized working fluid alternately to the first and second expel reservoirs, and preferably to allow the working fluid present in the other expel reservoir to be expelled into the low pressure zone.

Another advantage of the invention is that the drive liquid can fulfil certain requirements that are different from the requirements that the working fluid should fulfil. The drive liquid can therefore be optimised for its task of driving the hydraulic motor independently from specific requirements of the working fluid. For instance, a clean hydraulic oil that is free of erosive solid particulates can be utilised, which would be unsuitable as a drilling mud but particularly suitable for driving a hydraulic motor.

The first and/or second expel reservoir can comprise an outer tube and inner tube, whereby the inner tube is arranged inside the outer tube leaving an annular space between the inner tube and the outer tube to form the expel reservoir.

Due to the tube components, such an expel reservoir can be specially adopted for use in a drill string or in a drill collar. The inner tube could then form a bypass channel for passing drilling mud.

A movable wall can be arranged in the annular space, dividing the annular space into the first and second compartments of the expel reservoir, whereby each of the first and second compartments are provided with an inlet/outlet opening for passing a fluid to and from the respective compartment.

In the case of down hole operation of the hydraulic motor, the working fluid can be pressurized drilling mud. Due to the separate drive liquid, the risk of causing damage to the hydraulic motor as a result of passing of drilling mud is removed.

By collecting the drive liquid in the second expel reservoir, it can be recirculated through the hydraulic motor arrangement for use in a next cycle. This can for instance be done by supplying the pressurized working fluid alternately to the first and second expel reservoirs.

Preferably, the exhaust fluid is expelled from the second expel reservoir at the same volumetric rate as the drive liquid is expelled from the first expel reservoir. Herewith it is achieved that the maximum available hydraulic power in the pressurised working fluid can be directly consumed in the hydraulic motor.

In one embodiment, the flow of expelled drive liquid is controlled by means of an adjustable throttle opening. Herewith, control of the operation of the hydraulic motor is achieved without having to controllably throttle the working fluid. Instead the drive liquid is throttled, which drive liquid may be chosen to be a relatively clean liquid compared to the working fluid.

BRIEF DESCRIPTION OF THE DRAWINGS

The invention will be described hereinafter in more detail and by way of example, and more embodiments will be described hereinafter, with reference to the accompanying drawings in which:

FIG. 5 is a schematic cross section of an expel reservoir for the embodiment of FIG. 4.

DETAILED DESCRIPTION OF THE PREFERRED EMBODIMENT

Figure 1:
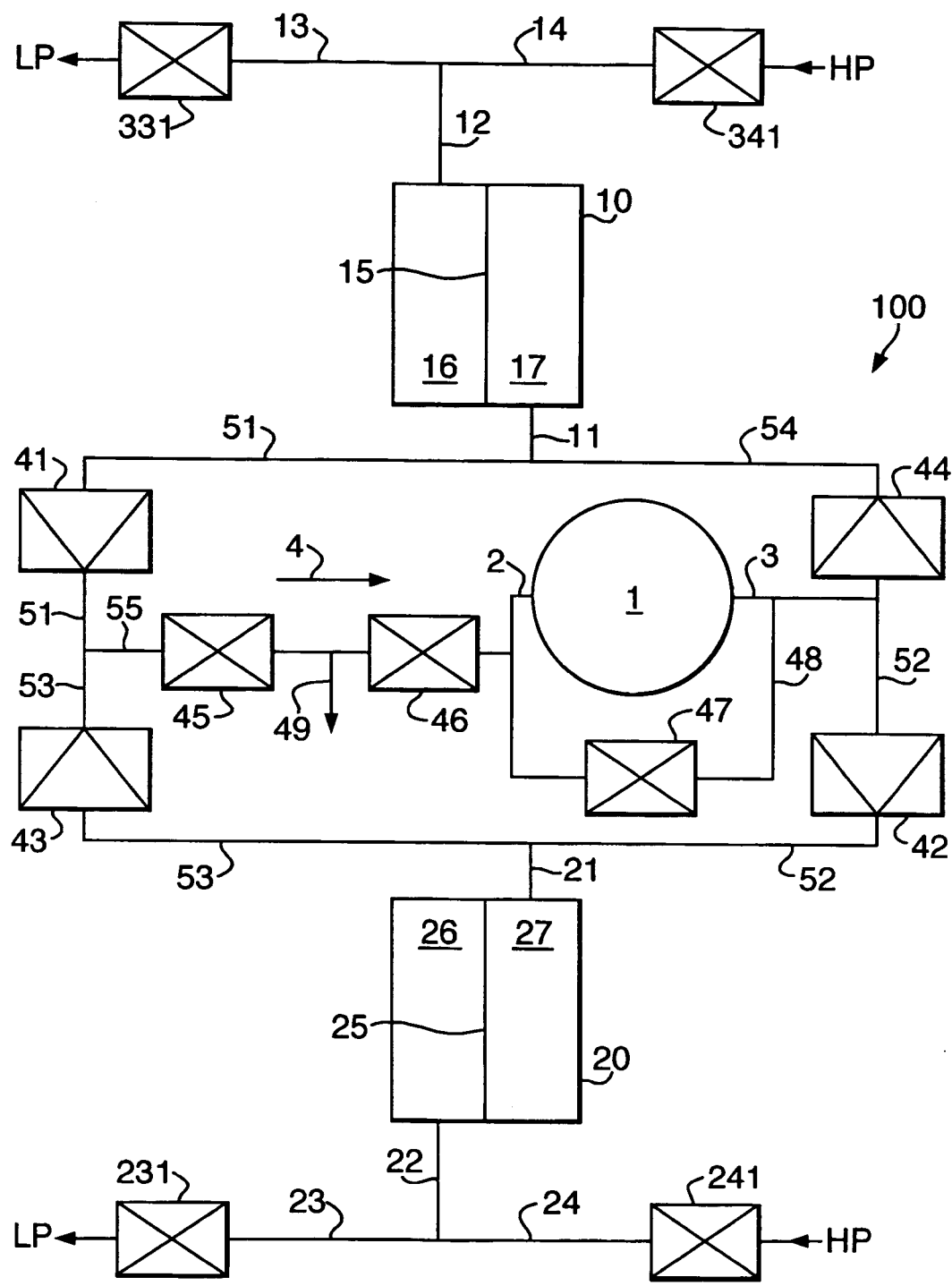
FIG. 1 is a schematic overview of the hydraulic motor arrangement according to an embodiment of the invention.

FIG. 1 shows a hydraulic motor arrangement comprising a hydraulic motor 1, which in this case is a rotary motor. Other types of hydraulic motors may be used as well.

The hydraulic motor can be part of a hydraulic generator wherein the hydraulic motor comprises mechanical output means, which mechanical output means are coupled to power conversion means for converting mechanical power to another power form including one or more of electric power, seismic power, and thermal power. A suitable seismic source, to convert the power to seismic power, is described in European patent application 04100238.7 of which priority is claimed.

The hydraulic motor 1 is drivable by passing a drive liquid under pressure from inlet channel 2 (inlet line 2) through the hydraulic motor 1 to outlet channel 3 (outlet line 3). The hydraulic motor us incorporated in an expel system which, in the embodiment of FIG. 1, includes a bridge manifold 100 for directing the flow of the drive liquid through the hydraulic motor 1. Further details of the bridge manifold 100 will be elucidated later in this specification.

The hydraulic motor arrangement is further provided with a first expel reservoir 10, and a second expel reservoir 20. The first expel reservoir 10 is arranged to hold the drive liquid that is to be passed through the hydraulic motor 1. The expel reservoir 10 is for this purpose fluidly connected to the bridge manifold 100 via a channel 11. The expel reservoir 10 is further connected to channel 12, which branches into a working fluid discharge line 13, and a working fluid supply line 14. Valve 331 is provided in working fluid discharge line 13, and valve 341 is provided in the working fluid supply line 14.

The second expel reservoir 20 is arranged to receive the drive liquid that has been passed through the hydraulic motor 1. This expel reservoir 20 is therefore fluidly connected to the bridge manifold 100 via channel 21. The second expel reservoir 20 is further connected to channel 22, which branches into a working fluid discharge line 23, and a working fluid supply line 24. Valve 231 is provided in working fluid discharge line 23, and valve 241 is provided in the wording fluid supply line 24.

Lines 14 and 24 thus form a supply manifold which can be fluidly connected to a pressurised working fluid supply. The valves 341 and 241 make it possible to select which of the first or second expel reservoirs is exposed to the pressurised working fluid.

Lines 13 and 23 debouche into a low pressure zone LP where the fluid pressure is lower than that of the pressurized working fluid. Valves 331 and 231 determine which of the expel reservoirs is exposed to the low pressure zone LP.

The bridge manifold 100 fluidly connects channel 11 to channel 21. Channel 11 branches into a line 54 provided with a check valve 44 in blocking direction, and into a line 51 provided with a check valve 41 in flow direction. Following line 51 through the check valve 41, the line branches into lines 53 and 55. Line 53 is provided with check valve 43 in blocking direction. Line 51 connects to line 2 leading to the hydraulic motor 1. Line 55 is provided with a valve 45 which can be opened or closed, and choke 46, both in series. Choke 46 is a variable flow restriction device.

An optional auxiliary line 49 is provided downstream valve 45 and upstream choke 46. This auxiliary line can be connected to an auxiliary apparatus (not shown) for triggering or activating the auxiliary apparatus as a result of pressurising line 49 prior to driving the hydraulic motor 1.

Line 3, downstream the hydraulic motor 1, branches into line 54 on the other side of check valve 44 mentioned above with respect to channel 11, and into line 52 which is also provided with a check valve 42. Both check valves 44 and 42 are in flow direction. However, due to the pressure loss in the hydraulic motor 1, there will be a pressure differential across check valve 44 preventing flow through that check valve. Flow through line 52 is possible, and downstream check valve 42 the line branches into lines 53 and 21. Line 53 is provided with a check valve 43 in flow direction, but since downstream check valve 43 line 53 is in fluid communication with line 51 which is upstream the hydraulic motor 1, the pressure differential across check valve 43 will prevent passage.

To prevent the hydraulic motor 1 from being damaged by its own inertia, a safety valve 47 can be applied as shown in FIG. 1, in a bypass line 48 shorting the hydraulic motor 1 by connecting the inlet line 2 and outlet line 3. The safety valve can be a check valve, blocking flow from line 2 to line 3 and allowing flow from line 3 to line 2. Herewith it is achieved that, in case hydraulic motor 1 is in motion while the pressure differential across the hydraulic motor 1 is not sufficient to drive it, the hydraulic motor 1 can drive circulation of the drive liquid through the bypass line 48.

The function of the bridge manifold 100, is to ensure that the drive liquid always flows in the direction of arrow 4 through line 55, no matter which one of the expel reservoirs 10 or 20 is pressurised.

Figure 2:
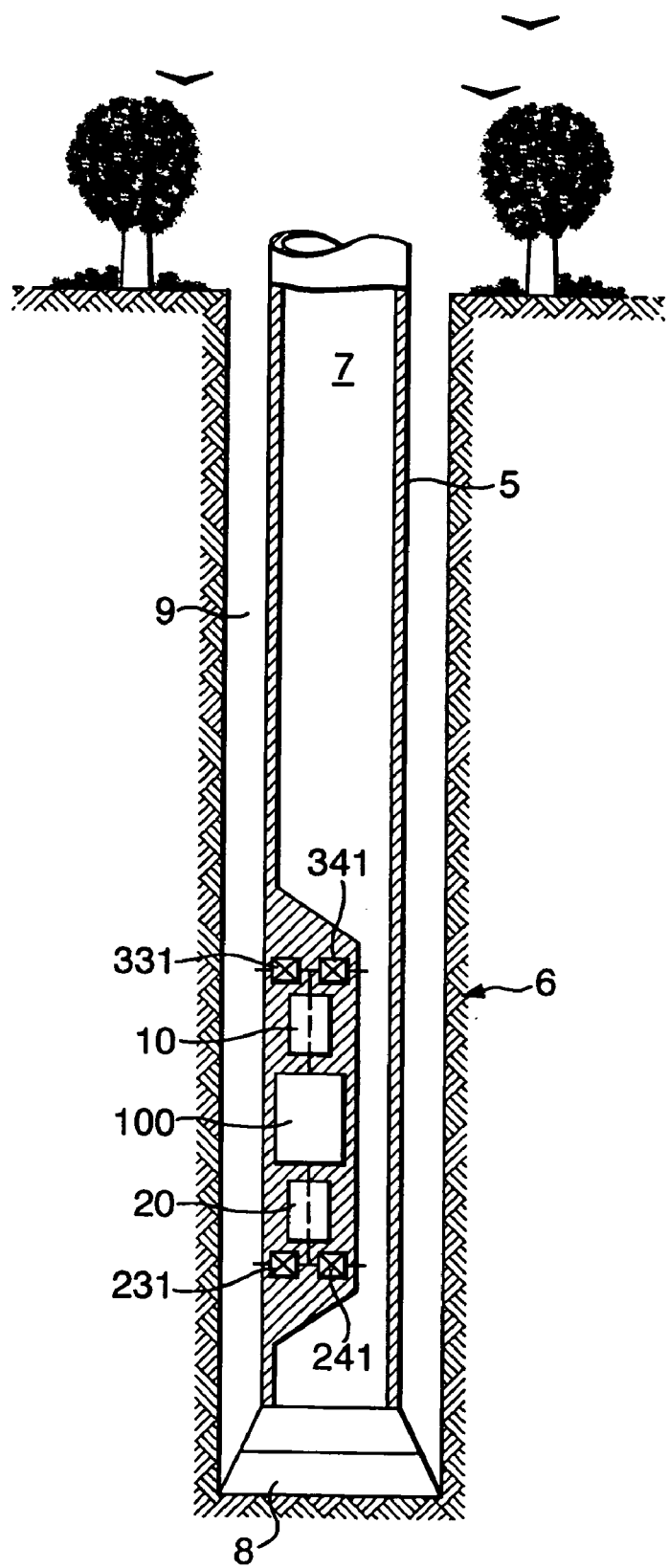
FIG. 2 is a schematic diagram of the hydraulic motor arrangement inside a drill string.

In a preferred embodiment, the hydraulic motor arrangement is suitable for being suspended in a subterranean bore hole and/or for being contained in a drill string. As an example, the hydraulic motor arrangement of FIG. 1 is installed in a drill string 5 reaching into a subterranean borehole 6 containing drilling mud, as schematically depicted in FIG. 2. The drilling mud can be circulated in a conventional way, wherein the drilling mud is pumped at the surface into a conduit 7 formed by the drill string 5, released into the borehole via an opening near the bottom end 8 of the drill string, and led back to the surface via an annular space 9 between the borehole wall and the drill string 5. Lines 14 and 24 (FIG. 1) are fluidly connected, via valves 341 and 241, to the drilling mud inside the drill string conduit 7, whereas lines 13 and 23 (FIG. 1) are fluidly connected, via valves 331 and 231, to the annular space 9.

In operation, the hydraulic motor arrangement of FIG. 1 works as follows. In an initial condition, expel reservoir 10 holds a good amount of drive liquid, and expel reservoir 20 holds an approximately similar amount of drilling mud. Valves 331, 341, 231, 241, 45, and choke 46 are closed. Drilling mud is circulated as described above, resulting in a pressure differential between the drilling mud pressure inside drill string conduit 7 and the drilling mud pressure in the annular space 9. Thus, the drill string conduit 7 is the high-pressure side HP of the hydraulic motor arrangement, and the annular space 9 is the low-pressure side LP.

Valve 341 is opened, thereby fluidly connecting expel reservoir 10 to the drill string conduit 7. Opening valve 341 will expose the drive liquid in reservoir 17 to the inner drill string pressure at no flow. Then valve 231 is opened, thereby connecting expel reservoir 20 to the annular space 9. Opening valve 231 will enforce the annulus pressure at no flow.

Opening valve 45 will deliver pressure to optional auxiliary line 49, at limited flow to trigger or activate the optional auxiliary apparatus, prior to driving the hydraulic motor 1. Gradually opening choke 46 will create an increasing flow of drive liquid from expel reservoir 10 to expel reservoir 20 (via lines 11, 51, 55, 2, 3, 52, and 21 respectively, as explained above), until the driving fluid has been displaced and expelled from the expel reservoir 10 by the pressurised drilling mud entering the expel reservoir 10 as the working fluid, and until the drilling mud has been displaced and expelled from the expel reservoir 20 by the drive liquid entering the expel reservoir 20. Controlling the choke 46 thus controls the operation of the hydraulic motor.

By closing all the valves, and opening valves 241 and 331 instead of 341 and 231, the hydraulic motor arrangement can be operated again, whereby drilling mud is received by expel reservoir 20, thereby displacing and expelling the drive liquid via respective lines 21, 53, 55, 2, 3, 54, and 11 into expel reservoir 10 again.

This cycle can be repeated.

Figure 3:
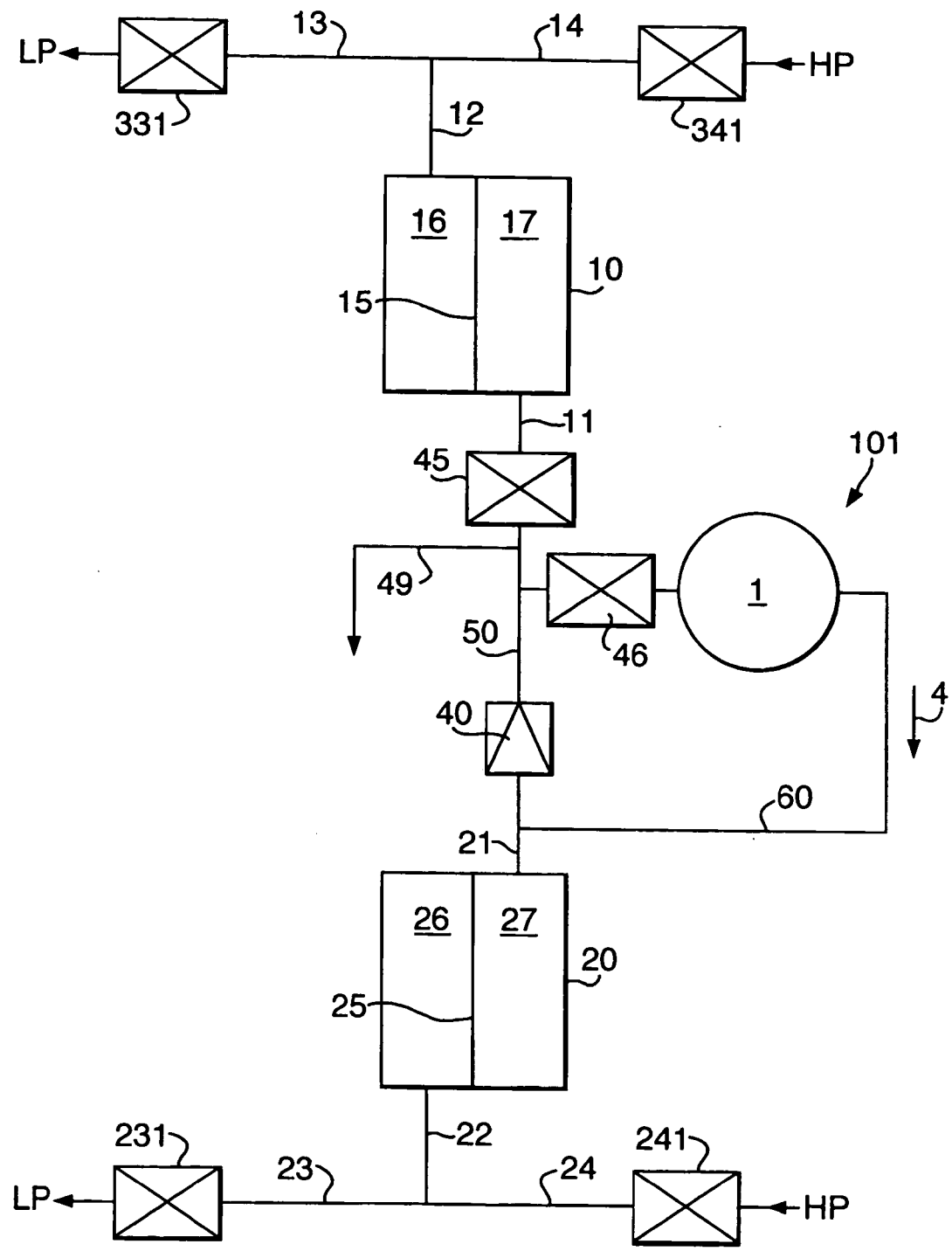
FIG. 3 is a schematic overview of the hydraulic motor arrangement according to another embodiment of the invention.

FIG. 3 shows an alternative hydraulic motor arrangement, having an expel system with a simpler manifold 101 than the bridge manifold 100 of FIG. 1. Manifold 101 is based on one check valve 40.

Like FIG. 1, the hydraulic motor arrangement of FIG. 3 is provided with first and second expel reservoirs 10 and 20, connected to manifold 101 via lines 11 and 21, respectively. Like in the embodiment of FIG. 1, the second expel reservoir 20 is arranged to receive the expelled drive liquid and, upon receipt thereof, to displace and expel working fluid into the low pressure zone so that the drive liquid can be collected in the second expel reservoir 20, and recirculated through the hydraulic motor arrangement for use in a next cycle.

The manifold 101 comprises line 50 which fluidly connects line 11 with line 12. Line 50 is separated from line 11 by means of valve 45. Check valve 40 is located in line 50 allowing flow in the direction from second expel reservoir 20 to first expel reservoir 10, and blocking flow in the reverse direction. The hydraulic motor 1 is located in line 60 which is arranged to bypass the check valve 40. Line 60 is also provided with a variable flow restriction device in the form of choke 46. Optionally, line 60 may be provided with a check valve for blocking the flow path from the second expel reservoir 20 to the first expel reservoir 10 through line 60.

Similar to the embodiment of FIG. 1, manifold 101 may be provided with optional auxiliary line 49, which in the embodiment of FIG. 3 may connect to line 50 between valve 45 and check valve 40. A bypass line 48, shorting the hydraulic motor 1, including a safety valve 47 can be provided to protect the hydraulic motor 1 in the same way as is shown in FIG. 1.

The expel reservoirs 10, 20, and the supply manifolds and low pressure zones LP can be the same as, or similar to, the ones of FIG. 1. The function of manifold 101, is to ensure that the drive liquid always flows in the direction of arrow 4 through line 60.

The hydraulic motor arrangement of FIG. 2 works as follows. In an initial condition, expel reservoir 10 holds a good amount of drive liquid, and expel reservoir 20 holds an approximately similar amount of working fluid, which can be a drilling mud. Valves 331, 341, 231, 241, 45, and choke 46 are initially closed. A pressure differential is established between the HP and the LP zones, for instance in the way described above involving circulation of drilling mud. Valve 341 is opened, thereby fluidly connecting expel reservoir 10 to the working fluid in the high pressure zone HP. Opening valve 341 will expose the drive liquid in reservoir 17 to the pressurised working fluid at no flow. Then valve 231 is opened, thereby connecting expel reservoir 20 to the low pressure zone LP. There is still no flow of the drive liquid.

Opening valve 45 will deliver pressure to optional auxiliary line 49, at limited flow to trigger or activate an optional auxiliary apparatus, prior to driving the hydraulic motor 1. Gradually opening choke 46 will create an increasing flow of drive liquid from expel reservoir 10 to expel reservoir 20 (via lines 11, 50, 60, 50, and 21 respectively), until the driving fluid has been displaced and expelled from the expel reservoir 10 by the pressurised working fluid entering the expel reservoir 10, and until the exhaust fluid has been displaced and expelled from the expel reservoir 20 by the drive liquid entering the expel reservoir 20. Controlling the choke 46 controls the operation of the hydraulic motor.

By closing all the valves, and opening valves 241 and 331 instead of 341 and 231, the hydraulic motor arrangement is reset to its initial condition, after which the cycle can be repeated. Since choke 46 and hydraulic motor 1 impose a flow resistance in line 60, the drive liquid will flow through check valve 40 from expel reservoir 20 back to expel reservoir 10 provided that valve 45 is opened.

The general principle of the hydraulic motor arrangements included in a drill string for instance such as is shown in FIG. 2, is that it is driven by virtue of the pressure differential between the drill string conduit 7 and the annular space 9. Alternatively, a pressure differential can be created within the drill string conduit 7 by provision of a suitable flow restriction, whereby lines 14 and 24 should connect to the drill string conduit 7 upstream of the flow restriction and lines 13 and 23 should connect to the drill string conduit 7 downstream of the flow restriction.

It will be understood that the hydraulic motor arrangement described with reference to FIG. 3 can be installed in a drill string in the same way as shown in FIG. 2. An advantage of the hydraulic motor arrangements described above, is that the drive liquid can be fully optimised for driving the hydraulic motor 1, and the drilling mud can be fully optimised for its purpose as a drilling fluid. Delicate mechanisms such as the choke 46 and the drive mechanism in hydraulic motor 1 are not exposed to the harsh conditions imposed by passing drilling mud.

Another advantage of the hydraulic motor arrangement in accordance with the invention, is that it can be operated using a gaseous working fluid even when the hydraulic motor requires a liquid driving fluid.

In order to prevent the drive liquid from being contaminated by the working fluid, a movable wall 15,25 is provided in the expel reservoirs 10,20 separating two compartments 16,17 and 26,27 in each of the expel reservoirs 10,20. First compartments 16 and 26 are reserved for receiving and containing the working fluid, and second compartments 17,27 are reserved for receiving and containing the drive liquid. The movable wall 15,25 may be provided in the form of a piston means which is slidably arranged in a cylindrical bore which is in fluid communication with the first and second compartments in the expel reservoir concerned.

Alternatively, the movable wall 15,25 may be provided in the form of a flexible wall, in particular a flexible membrane, such as a rubber membrane. An advantage of using a flexible wall is that it requires no sliding movement and therefore the risk of jamming is less than with a piston. Also, there is less risk of leakage resulting from mechanical wear.

In order to avoid the inlets to the compartments to be blocked by the movable wall, as a result of the wall being forced into the compartment by the load in the compartment, one or both of the compartments may be provided with a porous section to ensure that the inlets are in communication with a good deal of the volume inside the compartments. Such a porous section can for instance be provided in the form of inwardly protruding ribs on the inside walls of the compartments, or in the form of a flexible sponge-like material.

In the preferred embodiments, there is a predetermined fixed amount of drive liquid present in the expel system. In order to avoid the blockage problem in the working fluid compartment, it is possible to provide excess volume in the working fluid compartment such that an amount of the working fluid remains present in the expel reservoir in the situation that a maximum amount of drive liquid is present in the expel reservoir.

The hydraulic motor arrangements as depicted in FIGS. 1 and 3 are suitable for intermittently operating the hydraulic motor 1 during limited periods of time of which the maximum duration is dictated by the volume that is available in the expel reservoirs for exchanging drive liquid. The hydraulic motor arrangements are also particularly suitable for imposing a frequency sweep on the hydraulic motor 1, by gradually opening choke 46.

A quasi-continuous operation of the hydraulic motor 1 is achievable in the embodiment of FIG. 1 by appropriate concerted switching of valves 331, 231, 341, and 241, provided that the hydraulic motor 1 contains sufficient inertia to bridge the switching time.

For a more continuous operation, the hydraulic motor arrangement of FIG. 1 can be modified by providing at least three, and preferably at least four expel reservoirs in a "cyclic star"-arrangement whereby the expel reservoirs for instance go through their cycles with fixed phase differences.

The cycle can be operated again and again, and in this way a continuous flow of driving liquid through the hydraulic motor can be maintained.

Figure 4:
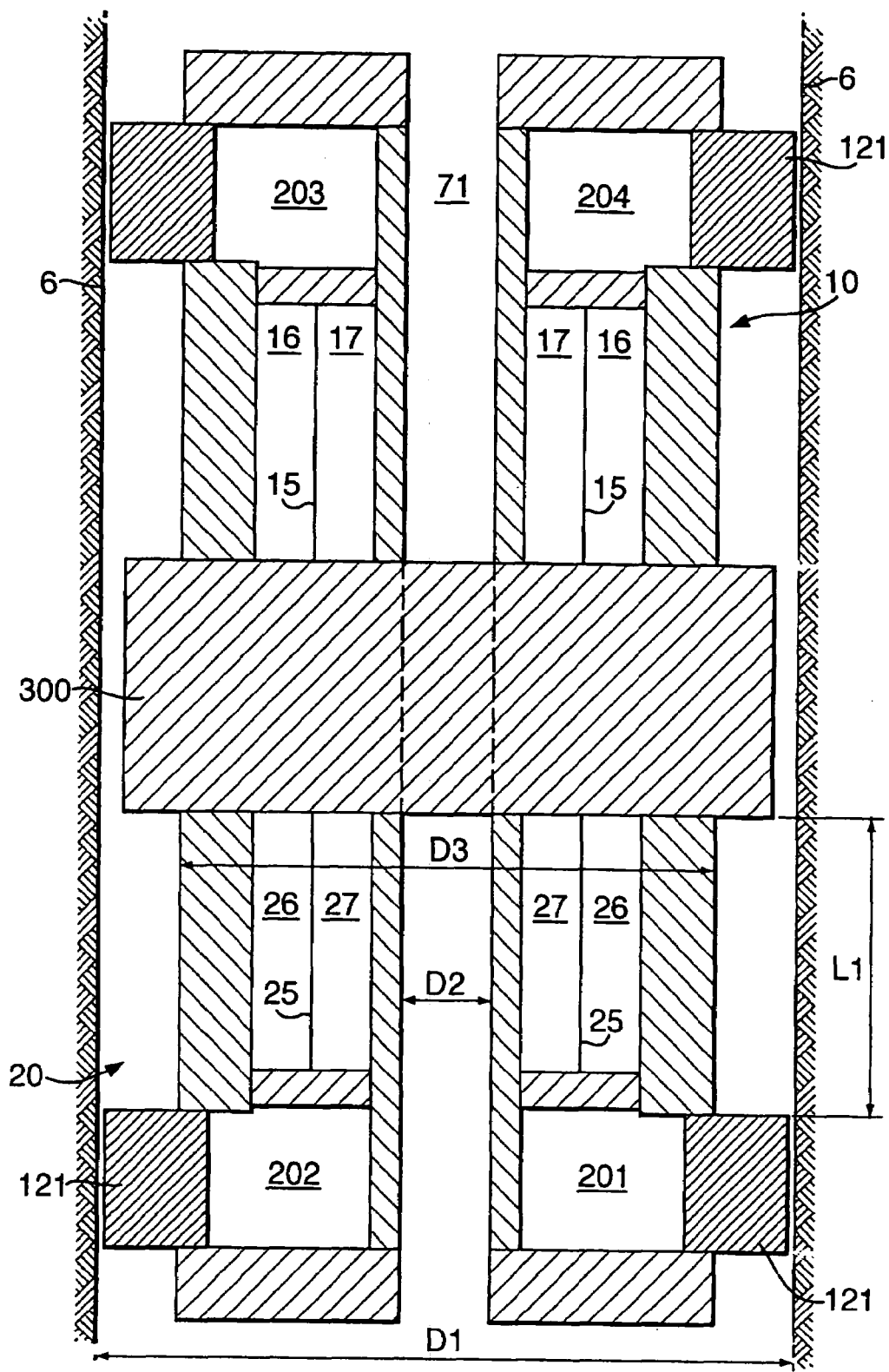
FIG. 4 is a schematic overview of a drill pipe provided with the hydraulic motor arrangement.

FIG. 4 schematically shows a preferred embodiment of a hydraulic motor arrangement as a drill string sub, which can be a section of a drill string. The first and second expel reservoirs 10,20 are disposed upstream and downstream of a unit 300 comprising a hydraulic motor. The expel reservoirs are shaped as a torus around a centrally disposed drilling mud passage 71. Cylindrical membranes 15,25 separate the respective compartments 16,26 for working fluid such as drilling mud, from compartments 17,27 for drive liquid such as hydraulic oil. In this example the outer compartments 16,26 are assigned as the working fluid compartments and the inner compartments 17,27 as the drive liquid compartments, but this may be assigned the other way round if so desired.

Compartments 201 to 204 are provided for housing the necessary valve means, and optionally other means such as control electronics and batteries for powering the control electronics and optionally also for powering the valves.

FIG. 5 shows a detailed embodiment for the torus shaped expel reservoir 10. This embodiment is also applicable for the expel reservoir 20. In this embodiment, the expel reservoir is arranged inside an outer tube 79, which is sandwiched between a cover body 75 on a mud side and a cover body 85 on a drive liquid side. Cover body 75 is provided with a supply/discharge channel 76 for supplying and discharging working fluid in the form of a drilling mud, and cover body 85 is provided with a supply/discharge channel 86 for supplying and discharging drive liquid. Supply/discharge channels 76 and 86 respectively correspond to or connect to lines 12 and 22 as schematically depicted in FIGS. 1 and 3.

Connected to the respective cover bodies 75 and 85 are membrane liners 72 and 82, which are connected by means of fastening means 77 and 87. The cover bodies 75, 85, and the membrane liners 72, 82, are provided with a central bore, which fluidly connects to a central tube 74 to form the centrally disposed drilling mud passage 71 which bypasses the expel reservoirs.

Membrane 15 is clamped between the membrane liners 72, 82 and respective clamping rings 73 and 83 which are connected to their membrane liners 72, 82 by fastening means 78 and 88 such that membrane 15 is held between the membrane liners 72, 82 and the respective clamping rings 73, 83. The membrane liners 72, 82 and/or the clamping rings 73, 83 are preferably provided with corrugated clamping surfaces to axially secure the membrane 15.

A working fluid compartment 16 is formed by the annular space defined between the outer tube 79 and the membrane 15, and a drive liquid compartment 17 is formed by the annular space defined between the inner tube 74 and the membrane 15.

The clamping ring 73 on the mud side is provided with a channel 70 that fluidly connects the working fluid compartment 16 with supply/discharge channel 76. Channel 70 can be provided in the form of a bore, but in the embodiment of FIG. 5 it is provided in the form of a groove in the outer periphery of the clamping ring 73 which groove together with the outer tube 79 forms the channel 70.

In a similar way, the membrane liner 82 on the working fluid side is provided with a channel 80 that fluidly connects the drive liquid compartment 17 with supply/discharge channel 86.

Suitably, the membrane 15 is formed by an essentially cylindrical rubber hose piece, having a wall thickness of 11 mm, more generally between 6 mm and 21 mm.

The outside wall of the inner tube 74 is provided with annular grooves to avoid the membrane 15 to fully engage with the inner tube and thereby block the channel 80. There is an excess volume reserved in the working fluid compartment 16 as compared to the volume of drive liquid that can be brought into the drive liquid compartment 17 under normal operation, in order to avoid the channel 70 from being blocked by the membrane 15.

In the embodiment of FIG. 5, the working fluid compartment and the drive liquid compartment comprise an inner annular space and an outer annular space, whereby in cross section the outer annular space essentially encircles the inner annular space. This embodiment is particularly suitable when a membrane wall is employed as the movable wall, because for a given expel volume it requires a relatively small displacement of the wall.

In an alternative embodiment, the movable wall is arranged such that the working fluid compartment and the drive liquid compartment are axially separated from each other. This can be suitably achieved by replacing the membrane 15 by an annular piston that is slidably seals against the inner tube 74 and the outer tube 79. It will be understood that the membrane liners 72, 82 and the clamping rings 73, 83 are not necessary in such an alternative embodiment, and that the inner tube should for example extend to the cover bodies 75 and 85.

Referring to FIGS. 4 and 5, in a practical example, the outer diameter D1 of the stabiliser pads 121 on drill pipe section can be 215 mm suitable for a so-called 8½"-hole. The diameter D2 of the drilling fluid passage 71 can be 38 mm (corresponding to 1½") and the outer diameter D3 of the outer tube 79 can be 170 mm (corresponding to 6¾"). Assuming an axial length L1 of 1 meter, there is space available for approximately 10 litres of drive liquid to exchange between the expel reservoirs 10 and 20. Further assuming a pressure differential of 80 bars between the working fluid supply point and the working fluid discharge point, which is realistic for drilling mud in a subterranean drilling operation, and a flow of 1 litre/second, this hydraulic motor arrangement should be able to deliver 7.8 kwatt for a duration of 10 seconds.

The invention claimed is:

1. A hydraulic motor arrangement comprising a hydraulic motor and supply means for supplying a drive liquid to the hydraulic motor for driving the hydraulic motor, which supply means comprises a first and a second expel reservoir, whereby the first expel reservoir is arranged to hold the drive liquid, and arranged to receive a pressurized working fluid different from the drive liquid from a high-pressure zone, and upon receipt thereof to displace and expel the drive liquid from the first expel reservoir into an expel system which includes the hydraulic motor, and whereby the second expel reservoir is arranged downstream the hydraulic motor to receive the expelled drive liquid and, upon receipt thereof, to displace and expel an exhaust fluid different from the drive liquid into a low-pressure zone, wherein the hydraulic motor arrangement is installed in a drill string, the drill string forming a conduit, wherein the high pressure zone is inside the drill string and the low pressure zone is outside the drill string.

2. The hydraulic motor arrangement of claim 1, wherein at least one of the expel reservoirs is provided with a first compartment for containing the working fluid and a second compartment for containing the drive liquid, whereby the two compartments separated by a movable wall.

3. The hydraulic motor arrangement of claim 1, wherein the expel system comprises a variable flow restriction device.

4. The hydraulic motor arrangement of claim 1, wherein a supply manifold is provided having supply valve means arranged to supply the pressurized working fluid alternately to the first and second expel reservoirs.

5. The hydraulic motor arrangement of claim 4, wherein the expel system comprises a bridge manifold wherein the hydraulic motor is incorporated, wherein the bridge manifold is provided with second valve means for directing the drive liquid through the hydraulic motor in a single flow direction.

6. The hydraulic motor arrangement of claim 5, wherein the second valve means include check valves.

7. The hydraulic motor arrangement of claim 1, wherein the hydraulic motor is drivable by passing the drive liquid under pressure from an inlet line through the hydraulic motor to an outlet line, and wherein a bypass channel is provided in the expel system connecting the inlet line and the outlet line and bypassing the hydraulic motor.

8. The hydraulic motor arrangement of claim 1, wherein the drill string is in a subterranean borehole, leaving an annular space between the borehole wall and the drill string and wherein the drill string conduit is at or near a surface end connectable to a working fluid supply pump for pumping the working fluid into the drill string conduit, and wherein the drill string conduit is on the other end via a flushing opening in fluid communication with the annular space forming a return path to the surface end.

9. The hydraulic motor arrangement of claim 8, wherein the drill string comprises an outer tube and wherein an inner tube is arranged inside the outer tube leaving an annular space between the inner tube and the outer tube forming at least one of the expel chambers.

10. The hydraulic motor arrangement of claim 9, whereby a movable wall is arranged in the annular space dividing the annular space into the first and second compartments, whereby each of the first and second compartments are provided with an inlet or outlet opening for passing a fluid to and from the respective compartment.

11. The hydraulic motor arrangement of claim 10, wherein the first compartment comprises an inner annular space and the second compartment comprises an outer annular space, whereby, as seen in cross section of the outer tube, the outer annular space is located radially adjacent to the inner annular space.

12. The hydraulic motor arrangement of claim 8, wherein the first expel reservoir is fluidly connectable to the drill string conduit and the second expel reservoir is fluidly connectable to the return path thereby bypassing the flushing opening in the drill string conduit.

13. The hydraulic motor arrangement of claim 1, wherein the hydraulic motor is part of a hydraulic generator wherein the hydraulic motor comprises mechanical output means, which mechanical output means are coupled to power conversion means for converting mechanical power to another power form including one or more of electric power, seismic power, and thermal power.

14. A method of operating a hydraulic motor, comprising the steps of:

suspending a drill string from a surface into a borehole, the drill string comprising a hydraulic motor arrangement comprising a first expel reservoir, a second expel reservoir, and a hydraulic motor, the first expel reservoir being filled with a drive liquid and the second expel reservoir being filled with an exhaust fluid different from the drive liquid;

pressurizing a working fluid that is different from the drive liquid;

circulating the pressurized working fluid from the surface through a conduit formed by the drill string into the borehole outside the drill string via a flushing opening near the bottom end of the drill string and back to the surface via an annular space between the borehole wall and the drill string;

imparting pressure of the pressurized working fluid to the drive liquid;

displacing the drive liquid and expelling the drive liquid from the first expel reservoir;

leading the expelled drive liquid through the hydraulic motor to the second expel reservoir thereby driving the hydraulic motor with the expelled drive liquid;

imparting pressure of the expelled drive liquid to the exhaust fluid; and displacing the exhaust fluid and expelling the exhaust fluid from the second expel reservoir into the annular space through an outlet that is not the flushing opening.

15. The method of claim 14, wherein the exhaust fluid is expelled from the second expel reservoir at the same volumetric rate as the drive liquid is expelled from the first expel reservoir.

16. The method of claim 14, wherein the flow of expelled drive liquid is controlled by means of an adjustable throttle opening.

17. The method of claim 14, wherein the pressurized working fluid is supplied alternately to the first and second expel reservoirs.

18. The hydraulic motor arrangement of claim 7, wherein the bypass channel includes a safety valve.

19. The hydraulic motor arrangement of claim 7, wherein the bypass line allows the drive liquid to flow from the outlet line to the inlet line.

20. A hydraulic motor arrangement comprising a hydraulic motor and supply means for supplying a drive liquid to the hydraulic motor for driving the hydraulic motor, which supply means comprises a first and a second expel reservoir, wherein the first expel reservoir is arranged to hold the drive liquid, and arranged to receive a pressurized working fluid different from the drive liquid from a high-pressure zone, and upon receipt thereof to displace and expel the drive liquid from the first expel reservoir into an expel system which includes the hydraulic motor and a line for the drive liquid to flow through, and wherein the second expel reservoir is arranged downstream the hydraulic motor to receive the expelled drive liquid and, upon receipt thereof, to displace and expel an exhaust fluid different from the drive liquid into a low-pressure zone, wherein a variable flow restriction device is provided in the line.

* * * * *